(12) United States Patent
Yorozu

(10) Patent No.: US 12,212,839 B2
(45) Date of Patent: *Jan. 28, 2025

(54) IMAGING APPARATUS AND IMAGING METHOD

(71) Applicant: SONY GROUP CORPORATION, Tokyo (JP)

(72) Inventor: Shutaro Yorozu, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/477,246

(22) Filed: Sep. 28, 2023

(65) Prior Publication Data

US 2024/0040233 A1  Feb. 1, 2024

Related U.S. Application Data

(63) Continuation of application No. 17/661,797, filed on May 3, 2022, now Pat. No. 11,805,308, which is a
(Continued)

(30) Foreign Application Priority Data

Oct. 21, 2016  (JP) ................... 2016-207107

(51) Int. Cl.
*H04N 23/62* (2023.01)
*H04N 5/765* (2006.01)
(Continued)

(52) U.S. Cl.
CPC ............. *H04N 23/62* (2023.01); *H04N 5/765* (2013.01); *H04N 23/53* (2023.01); *H04N 23/66* (2023.01)

(58) Field of Classification Search
CPC ............... H04N 5/23216; H04N 5/765; H04N 5/23203; H04N 5/22525; H04N 23/66
(Continued)

(56) References Cited

U.S. PATENT DOCUMENTS 5,122,880 A   6/1992 Nagano
2002/0197988 A1  12/2002 Hellaker
(Continued)

FOREIGN PATENT DOCUMENTS

JP   03-010577 A   1/1991
JP   2010-081022 A   4/2010
(Continued)

OTHER PUBLICATIONS

International Preliminary Report on Patentability of PCT Application No. PCT/JP2017/036455, issued on May 2, 2019, 09 pages of English Translation and 05 pages of IPRP.
(Continued)

*Primary Examiner* — Lin Ye
*Assistant Examiner* — Chan T Nguyen
(74) *Attorney, Agent, or Firm* — CHIP LAW GROUP

(57) ABSTRACT

The present disclosure relates to an imaging apparatus, an imaging method, and a program that enable operation in which a display unit is brought into a turn-off state when a predetermined time elapses after start of capturing a moving image, a command from a remote commander is accepted and executed, and the captured moving image is output to an external apparatus. In a case where a manipulation unit that outputs a command depending on content of a user manipulation is manipulated and a command causing a moving image to be recorded on a recording medium is output, recording of the moving image is started and the display unit
(Continued)

is controlled to a turn-off state in which an image is not displayed. The present disclosure can be applied to an imaging apparatus.

18 Claims, 9 Drawing Sheets

Related U.S. Application Data continuation of application No. 16/336,648, filed as application No. PCT/JP2017/036455 on Oct. 6, 2017, now Pat. No. 11,350,027.

(51) Int. Cl.
*H04N 23/53* (2023.01)
*H04N 23/66* (2023.01)

(58) Field of Classification Search
USPC .................................................. 348/331.11
See application file for complete search history.

(56) References Cited

U.S. PATENT DOCUMENTS

| | | | |
|---|---|---|---|
| 2004/0223057 A1 | 11/2004 | Oura et al. | |
| 2006/0121956 A1* | 6/2006 | Lee | H04M 1/0262 |
| | | | 455/574 |
| 2007/0131268 A1 | 6/2007 | Taniguichi et al. | |
| 2010/0073516 A1 | 3/2010 | Minakuti et al. | |
| 2010/0227651 A1 | 9/2010 | Kim | |
| 2011/0074945 A1 | 3/2011 | Watanabe et al. | |
| 2011/0138332 A1* | 6/2011 | Miyagawa | H04N 23/633 |
| | | | 715/835 |
| 2012/0134642 A1 | 5/2012 | Okamura | |
| 2013/0124207 A1 | 5/2013 | Sarin et al. | |
| 2014/0168448 A1* | 6/2014 | Ozawa | H04N 23/635 |
| | | | 348/170 |
| 2014/0307115 A1 | 10/2014 | Suki et al. | |
| 2015/0334335 A1 | 11/2015 | White et al. | |
| 2016/0182864 A1 | 6/2016 | Izawa et al. | |
| 2016/0292989 A1 | 10/2016 | Belk et al. | |

FOREIGN PATENT DOCUMENTS

| | | |
|---|---|---|
| JP | 2013-251729 A | 12/2013 |
| JP | 2014-120948 A | 6/2014 |
| JP | 2015-222879 A | 12/2015 |
| KR | 10-2007-0071361 A | 7/2007 |

OTHER PUBLICATIONS

International Search Report and Written Opinion of PCT Application No. PCT/JP2017/036455, issued on Dec. 19, 2017, 09 pages of English Translation and 08 pages of ISRWO.

Advisory Office Action for U.S. Appl. No. 17/661,797, issued on Apr. 20, 2023, 03 pages.

Non-Final Office Action for U.S. Appl. No. 16/336,648, issued on Jul. 30, 2021, 22 pages.

Notice of Allowance for U.S. Appl. No. 16/336,648, issued on Mar. 8, 2022, 03 pages.

Notice of Allowance for U.S. Appl. No. 16/336,648, issued on Feb. 16, 2022, 09 pages.

Notice of Allowance for U.S. Appl. No. 16/336,648, issued on Feb. 3, 2022, 13 pages.

Notice of Allowance for U.S. Appl. No. 17/661,797, issued on Jun. 28, 2023, 09 pages.

Final Office Action for U.S. Appl. No. 17/661,797, issued on Feb. 17, 2023, 17 pages.

Non-Final Office Action for U.S. Appl. No. 17/661,797, issued on Oct. 6, 2022, 16 pages.

\* cited by examiner

IMAGING APPARATUS AND IMAGING METHOD

CROSS REFERENCE TO RELATED APPLICATIONS

The present application is a continuation application of U.S. patent application Ser. No. 17/661,797, filed May 3, 2022, which is a continuation application of U.S. patent application Ser. No. 16/336,648, filed Mar. 26, 2019, now U.S. Pat. No. 11,350,027, which is a U.S. National Phase of International Patent Application No. PCT/JP2017/036455 filed on Oct. 6, 2017, which claims priority benefit of Japanese Patent Application No. JP 2016-207107 filed in the Japan Patent Office on Oct. 21, 2016. Each of the above-referenced applications is hereby incorporated herein by reference in its entirety.

TECHNICAL FIELD

The present disclosure relates to an imaging apparatus, an imaging method, and a program, and more particularly, to an imaging apparatus, an imaging method, and a program in which a display unit is brought into a turn-off state when a predetermined time elapses after start of recording an image, the turn-off state is maintained even when a command from a remote commander is received, and the display unit is returned to a display state only when a manipulation unit of a main body is manipulated.

BACKGROUND ART

In an imaging apparatus of recent years, a display unit for displaying a preview image or an image being captured is provided in the main body of the imaging apparatus. While watching the preview image or the image being captured displayed on the display unit, a user changes the orientation of the imaging apparatus main body and adjusts the angle of view to be captured.

However, in a case where a captured image is recorded for a long period of time, continuation of the display state of the display unit which is not frequently viewed results in increases in unnecessary power consumption due to backlight of the display unit or the like.

In view of this, there has been proposed an imaging apparatus that turns off the display unit to reduce the power consumption in a long period of time imaging mode in which exposure time is long (see Patent Document 1).

CITATION LIST

Patent Document

Patent Document 1: Japanese Patent Application Laid-Open No. 2015-222879

SUMMARY OF THE INVENTION

Problems to be Solved by the Invention

However, with the imaging apparatus described in Patent Document 1 described above, it is not possible to accept a command from a remote controller and execute the command in a state in which the display unit is turned off or to output a moving image being captured to an external apparatus when the moving image is captured.

The present disclosure has been made in view of such circumstances, and particularly enables operation in which while a display unit is brought into a turn-off state when a predetermined time elapses from start of capturing a moving image, a command from a remote commander is accepted and executed and a captured moving image is output to an external apparatus.

Solutions to Problems

The imaging apparatus according to an aspect of the present disclosure is an image apparatus including: an imaging unit configured to capture an image; a manipulation unit configured to accept a user manipulation and give an instruction of an operation depending on content of the accepted manipulation; and a display control unit configured to control display of the captured image, in which the display control unit controls the display of the image from a display state to a turn-off state in a case where a predetermined time elapses in a state in which manipulation with respect to the manipulation unit is not detected after start of a predetermined operation.

The display control unit can be caused to control the display of the image from the display state to the turn-off state in a case where a predetermined time elapses in a state in which manipulation with respect to the manipulation unit is not accepted after start of a recording operation as the predetermined operation.

The display control unit can be caused to control the display of the image from the turn-off state to the display state in a case where the recording operation is stopped after control is performed from the display state in which the image is displayed to the turn-off state in which the display of the image is turned off.

The display control unit can be caused to control the display of the image from the turn-off state to the display state in a case where manipulation is accepted by the manipulation unit after the display of the image is controlled from the display state to the turn-off state.

A reception unit configured to receive a signal from a remote manipulation unit that is external to an apparatus main body and configured to accept a user manipulation and transmit an instruction depending on the content of the accepted manipulation as the signal can be further included, in which the display control unit can be caused to control the display of the image from the display state to the turn-off state in a case where a predetermined time elapses in a state in which manipulation with respect to the manipulation unit is not accepted and in a state in which the signal from the remote manipulation unit is not received via the reception unit after start of the recording operation as the predetermined operation.

The display control unit can be caused to perform control to maintain the turn-off state even in a case where the signal from the remote manipulation unit is received via the reception unit after the display of the image is controlled from the display state to the turn-off state.

The reception unit can be caused to receive an instruction from a remote commander or a smartphone depending on the content of the user manipulation with respect to the remote commander or the smartphone as the remote manipulation unit.

An input/output unit configured to constantly output the image captured by the imaging unit to external equipment connected to the outside can be further included.

The input/output unit can be caused to accept, via the external equipment, input of the signal from the remote manipulation unit that is external to the external equipment and configured to accept the user manipulation and transmit an instruction depending on the content of the accepted manipulation as the signal, and the display control unit can be caused to control the display of the image from the display state to the turn-off state in a case where a predetermined time elapses in a state in which the manipulation with respect to the manipulation unit is not accepted and in a state in which the manipulation with respect to the remote manipulation unit is not accepted via the input/output unit after start of the predetermined operation.

The display control unit can be caused to perform control to maintain the turn-off state even when the signal from the remote manipulation unit is accepted via the input/output unit after the display of the image is controlled from the display state to the turn-off state.

The external equipment can be a display apparatus configured to display an image captured by the imaging unit.

The predetermined operation can be a recording operation, a power-on operation, or various setting operations.

An abnormality detection unit configured to detect occurrence of an abnormality can be further included, in which in a case where an abnormality is detected by the abnormality detection unit, the display control unit can be caused to control the display of the image to the display state.

A setting unit configured to perform setting related to imaging by the imaging unit can be further included, in which under a condition that the setting related to the imaging by the imaging unit is completed by the setting unit, the display control units can be caused to control the display of the image from the display state to the turn-off state in a case where a predetermined time elapses in a state in which the manipulation with respect to the manipulation unit is not accepted after start of the predetermined operation.

The imaging method according to an aspect of the present disclosure is an imaging method including steps of: capturing an image; accepting a user manipulation and giving an instruction of an operation depending on content of the accepted manipulation; and controlling display of the captured image, in which the display of the image is controlled from a display state to a turn-off state in a case where a predetermined time elapses in a state in which manipulation with respect to the[a] manipulation unit is not detected after start of a predetermined operation.

The program according to an aspect of the present disclosure is a program causing a computer to function as: an imaging unit configured to capture an image; a manipulation unit configured to accept a user manipulation and give an instruction of an operation depending on content of the accepted manipulation; and a display control unit configured to control display of the captured image, in which the display control unit controls the display of the image from a display state to a turn-off state in a case where a predetermined time elapses in a state in which manipulation with respect to the manipulation unit is not detected after start of a predetermined operation.

According to an aspect of the present disclosure, an image is captured, a user manipulation is accepted, an instruction of an operation depending on content of the accepted manipulation is given, display of the captured image is controlled, and the display of the image is controlled from the display state to the turn-off state in a case where a predetermined time elapses in a state in which manipulation with respect to the manipulation unit is not detected after start of a predetermined operation.

Effects of the Invention

According to an aspect of the present disclosure, the display unit can be brought into the turn-off state when a predetermined time elapses after start of capturing a moving image, a command from the remote commander can be accepted and executed, and moreover the captured moving image can be output to the external apparatus.

MODE FOR CARRYING OUT THE INVENTION

Figure 1:
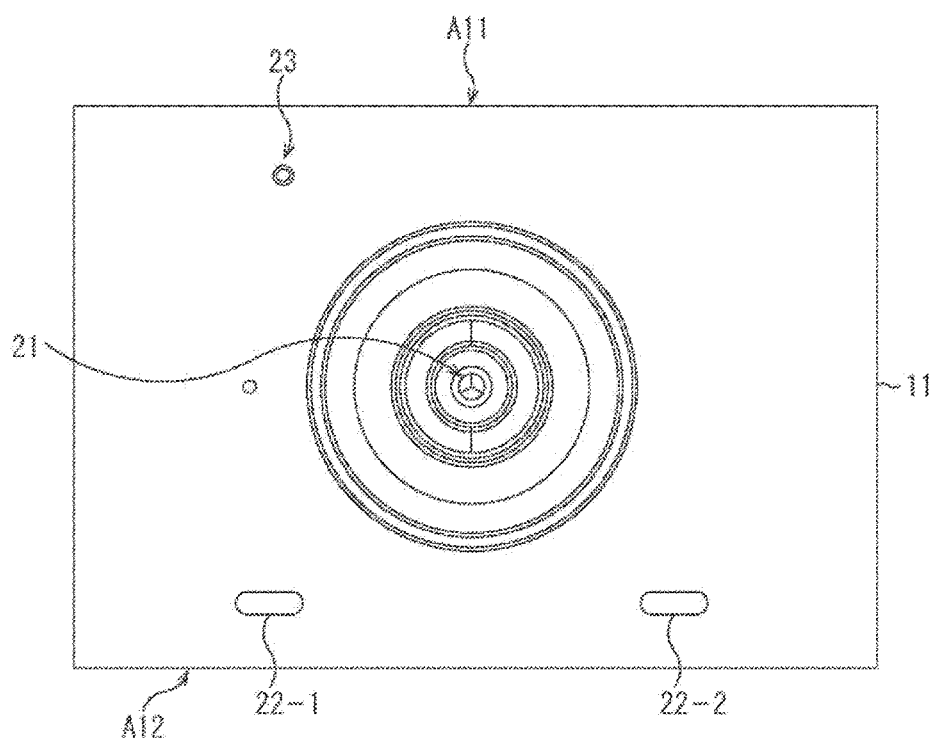
FIG. 1 is a front view of an external appearance of an imaging apparatus to which the technique of the present disclosure has been applied.

Hereinafter, a preferred embodiment of the present disclosure will be described in detail with reference to the accompanying drawings. Note that, in this description and the drawings, configuration elements that have substantially the same function and configuration are denoted with the same reference numerals, and repeated explanation is omitted.

<Configuration Example of External Appearance of Imaging Apparatus>

The imaging apparatus of the present disclosure captures a moving image and, moreover, in a case of recording a captured image, brings the display unit into the turn-off state. When a user manipulation is detected by an external manipulation apparatus, e.g., a remote commander, with the display unit being in the turn-off state, a command corresponding to the manipulation content is transmitted, and the imaging apparatus can accept and execute the command. Furthermore, the imaging apparatus of the present disclosure can output the captured moving image to a display apparatus, which is an external apparatus, and cause the display apparatus to display the captured moving image with the display unit provided on the apparatus main body being in the turn-off state. Before description is given of the imaging apparatus of the present disclosure, first a configuration example of the external appearance of the imaging apparatus to which the present technology has been applied is described with reference to FIGS. 1 to 4.

FIG. 1 illustrates a front view of the external appearance of the imaging apparatus.

The imaging apparatus 11 includes, for example, a digital camera and the like, and is configured such that a user, a cameraman, has the imaging apparatus 11 with the hand to perform imaging, and furthermore the imaging apparatus 11 can be fixed to a bicycle, a ceiling, a wall, or the like to perform imaging.

The imaging apparatus 11 includes, on a front surface, a lens 21 for guiding light from a subject to an imaging element, which is not illustrated. Furthermore, a sound collection unit 22-1 and a sound collection unit 22-2 including a microphone for collecting ambient sounds during imaging of a moving image are provided below the lens 21 in the front surface part of the imaging apparatus 11 in the drawing. Basically, sounds collected by the sound collection unit 22-1 are right channel sounds and sounds collected by the sound collection unit 22-2 are left channel sounds.

Note that the sound collection unit 22-1 and the sound collection unit 22-2 are hereinafter also simply called the sound collection unit 22 in a case where there is no particular necessity for distinction.

A tally lamp 23 is provided on an upper left of the front surface part of the imaging apparatus 11 in the drawing. The tally lamp 23 is configured to be turned on during imaging of a moving image by the imaging apparatus 11 and turned off in a state where imaging of a moving image is not performed.

Furthermore, usually, when a moving image or a still image is captured by the imaging apparatus 11, imaging is performed with the upper surface indicated by arrow A11 facing upward in the vertical direction, i.e., with the bottom surface indicated by arrow A12 facing the ground.

Figure 2:
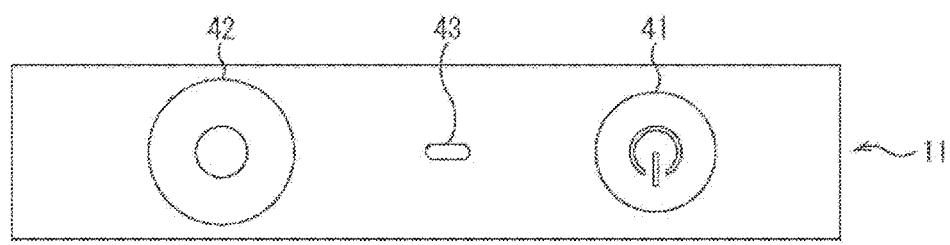
FIG. 2 is a top view of an external appearance of an imaging apparatus to which the technique of the present disclosure has been applied.

Therefore, the upper surface of the imaging apparatus 11 includes a power button 41, a shutter button 42, a sound output unit 43, and the like as illustrated, for example, in FIG. 2. Note that FIG. 2 illustrates an upper surface view of the imaging apparatus 11 viewed from top to bottom in FIG. 1.

The power button 41 is a button to be manipulated when the power of the imaging apparatus 11 is turned on/off. The shutter button 42 is manipulated, for example, to capture a still image, to start imaging of a moving image, or to stop imaging of a moving image.

The sound output unit 43 includes, for example, a speaker and the like, and reproduces sounds of a moving image when the moving image is reproduced.

Figure 3:
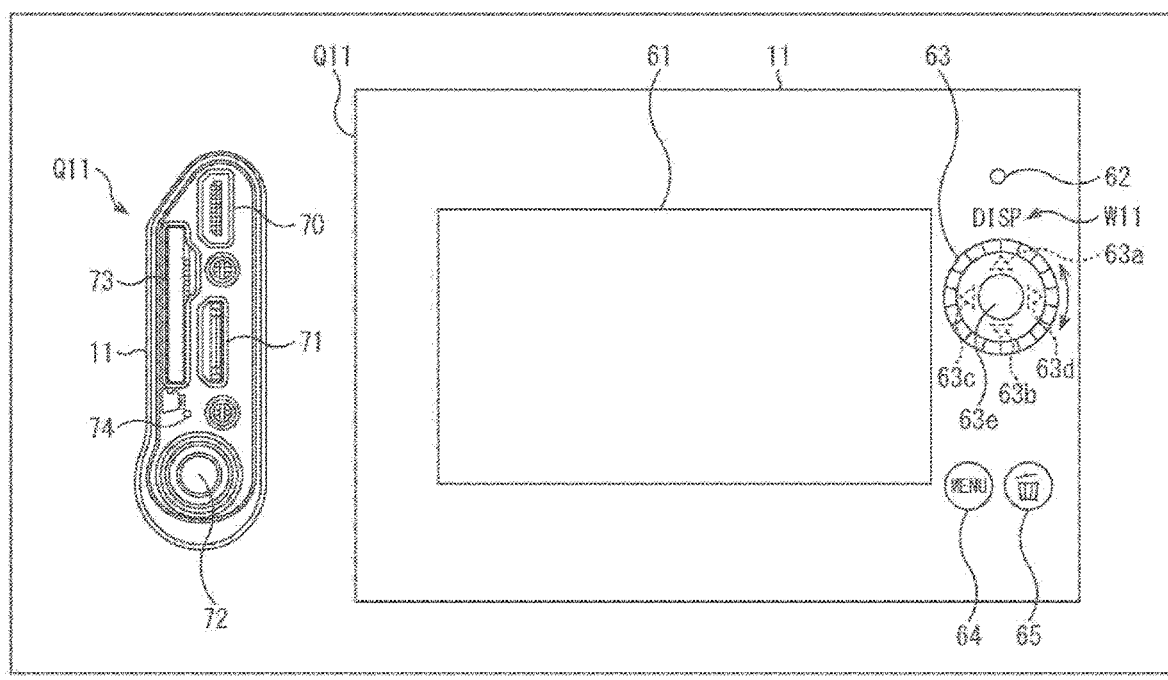
FIG. 3 is a rear view of an external appearance of an imaging apparatus to which the technique of the present disclosure has been applied.

Furthermore, on a surface opposite to the front surface of the imaging apparatus 11 illustrated in FIG. 1, i.e., on the back surface of the imaging apparatus 11, for example, various buttons or the like are provided as illustrated in the right part of FIG. 3. Note that, in the right part of FIG. 3, the upper side of the right part of FIG. 3 of the imaging apparatus 11 is the upper surface side and the lower side of the right part of FIG. 3 of the imaging apparatus 11 is the bottom surface side.

The back surface of the imaging apparatus 11 includes a display unit 61 including, for example, a liquid crystal display (LCD) and the like for displaying various images.

Furthermore, a tally lamp 62, a control wheel 63, a menu button 64, and a delete button 65 are provided around the display unit 61.

Similar to the tally lamp 23 provided on the front surface of the imaging apparatus 11, the tally lamp 62 is turned on during imaging of a moving image and turned off in a state where imaging of a moving image is not performed.

The control wheel 63 is manipulated when manipulation is performed on an image, a menu screen, or the like displayed on the display unit 61.

In more detail, the control wheel 63 can be rotated in arrow directions in the drawing about a disk-shaped main body. The control wheel 63 is manipulated, for example, when a cursor or the like is moved upward, downward, rightward, or leftward on the menu screen, when scroll manipulation for displaying an upper, left, right or left region of an image obtained by imaging is performed depending on rotation, or the like.

Furthermore, the control wheel 63 functions as buttons 63a to 63d that accept pressing manipulation at each triangle mark indicated by the dotted lines in the drawing and accepts an upward, downward, rightward, or leftward manipulation for cursor movement or an image scroll manipulation.

Furthermore, the buttons 63a to 63d may be assigned a function for achieving various settings. For example, the button 63a may be assigned a screen display switching function. Furthermore, the button 63b may be assigned a function for setting exposure compensation. Moreover, the button 63c may be assigned a function for setting a drive mode. Furthermore, the button 63d may be assigned a function for setting a flash mode.

The central part of the control wheel 63 includes a button 63e for accepting pressing manipulation. The button 63e functions as an enter key (ok button) for determining selection in a state where a menu screen or the like is displayed.

The menu button 64 is manipulated to cause various menu screens to be displayed.

The delete button 65 is a button to be manipulated when an image displayed on the display unit 61 is deleted.

Moreover, as illustrated in the left part of FIG. 3, a cover, which is not illustrated, is attached to a main body side surface Q11 on the left side when viewed from the back surface of the imaging apparatus 11. The cover, which is not illustrated, can be removed from the imaging apparatus 11 when a lock button, which is not illustrated, is manipulated.

Below the cover, which is not illustrated, on the side surface of the main body of the imaging apparatus 11, various terminals and a slot are provided as illustrated at the main body side surface Q11 in the left part of FIG. 3. Here, the left part of FIG. 3 indicates a state in which the cover, which is not illustrated, of the main body side surface Q11 is removed.

In this example, under the cover, which is not illustrated, of the main body side surface Q11 of the imaging apparatus 11, a terminal 70 of high-definition multimedia interface (HDMI)® and a terminal 71 of universal serial bus (USB)® are provided as input/output terminals for connection to the outside.

Furthermore, under the cover, which is not illustrated, of the main body side surface Q11 of the imaging apparatus 11, a terminal 72 for attachment of a microphone, a slot 73, which is a port for insertion of a removable recording medium that can be attached to or detached from the imaging apparatus 11, and a medium access lamp 74 for giving a notice of access or the like to the removable recording medium are provided.

Figure 4:
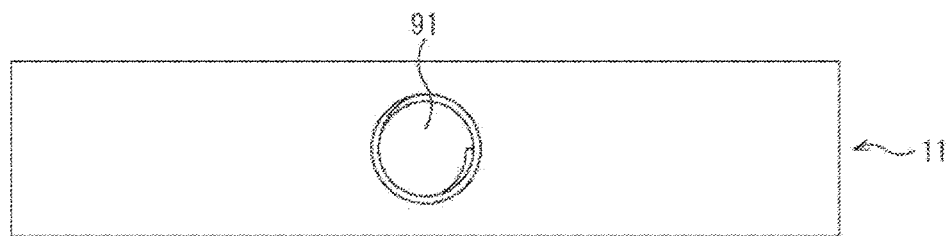
FIG. 4 is a bottom view of an external appearance of an imaging apparatus to which the technique of the present disclosure has been applied.

Furthermore, on the bottom surface of the imaging apparatus 11, a socket 91, which is a fixation part for fixing the imaging apparatus 11 to a tripod or the like, is provided as illustrated, for example, in FIG. 4. When the imaging apparatus 11 is fixed to a ceiling, a wall or the like by means of the socket 91, imaging or the like can be performed with the imaging apparatus 11 being in an inversed state or being rotated 90 degrees.

<Functional Configuration Example of Imaging Apparatus>

Next, a functional configuration example of the imaging apparatus 11 is described with reference to FIG. 5.

Figure 5:
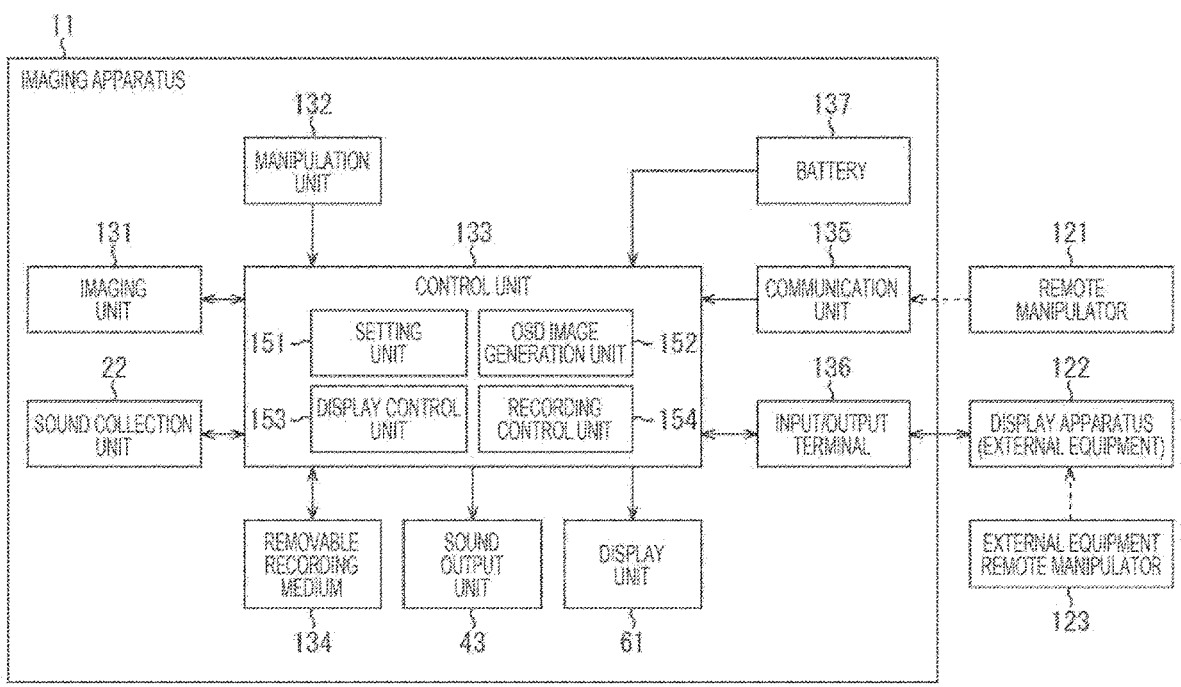
FIG. 5 is a diagram explaining a functional configuration example for achieving the imaging apparatus of FIGS. 1 to 4.

FIG. 5 is a diagram illustrating a functional configuration example of the imaging apparatus 11. Note that parts corresponding to those in the case of FIGS. 1 to 4 are designated by the same reference numerals in FIG. 5 and description is omitted as appropriate.

In the example illustrated in FIG. 5, remote manipulation of the imaging apparatus 11 can be performed by a remote manipulator 121. External equipment 122 including a recorder with a display, a display, or the like can be connected to the imaging apparatus 11, for example, with the use of an HDMI cable or a USB cable to the terminal 70 for HDMI, the terminal 71 for USB or the like described above. Further description is given below on the basis of the assumption that the external equipment 122 is a display apparatus including a display or the like. Furthermore, remote manipulation of the external equipment 122 and the imaging apparatus 11 can be performed by external equipment remote manipulator 123 dedicated to the external equipment 122. Note that the external equipment 122 is hereinafter also called the display apparatus 122. Furthermore, the external equipment remote manipulator 123, which is a source for transmitting a command to the imaging apparatus 11, is simply called the remote manipulator 123 in a case where there is no particular necessity for distinction with respect to the remote manipulator 121.

The imaging apparatus 11 includes an imaging unit 131, the sound collection unit 22, a manipulation unit 132, a control unit 133, a removable recording medium 134, the sound output unit 43, the display unit 61, a communication unit 135, the input/output terminal 136, and a battery 137.

The imaging unit 131 includes the lens 21 illustrated in FIG. 1, an imaging element or the like. The imaging unit 131 captures an image by receiving and photoelectrically converting light from a subject under control of the control unit 133, and feeds an image data of the obtained image to the control unit 133. Note that the image obtained by the imaging unit 131 is hereinafter also particularly called the captured image.

The sound collection unit 22 collects ambient sounds under control of the control unit 133 and feeds sound data of the resultant collected sounds to the control unit 133.

The manipulation unit 132 includes, for example, the power button 41 and the shutter button 42 illustrated in FIG. 2, the upper control wheel 63 illustrated in FIG. 3 (including the buttons 63a to 63e), the menu button 64, the delete button 65, a touch panel provided in a manner of being superimposed on the display unit 61, and the like. The manipulation unit 132 detects and accepts a user manipulation, and feeds a signal corresponding to a command corresponding to the manipulation content to the control unit 133. In other words, the manipulation unit 132 accepts the user manipulation and outputs a signal that gives an instruction of causing the control unit 133 to execute an operation corresponding to the accepted manipulation content.

The control unit 133 is driven by power fed from the battery 137 and controls the entire operation of the imaging apparatus 11. The control unit 133 includes a setting unit 151, an on screen display (OSD) image generation unit 152, a display control unit 153, and a recording control unit 154.

The setting unit 151 performs various settings depending on a signal from the manipulation unit 132. The OSD image generation unit 152 generates an OSD image.

The OSD image is, for example, an image that indicates a mark indicating an imaging mode or indicating the remaining charge level of the battery, or an image indicating a mark or an image that indicates various settings of a mark or the like that indicates white balance setting, a state related to the imaging apparatus 11, or the like. For example, the control unit 133 calculates the remaining charge level from a residual voltage of the battery 137 or the like and feeds the remaining charge level to the OSD image generation unit 152 to cause the OSD image generation unit 152 to generate an OSD image indicate the remaining charge level of the battery 137 and, in a case where the remaining charge level is smaller than a predetermined value, cause the OSD image generation unit 152 to generate an OSD image as a caution image indicating that the remaining charge level is small. In addition, the control unit 133 detects an abnormality, e.g., overheat, and causes the OSD image generation unit 152 to generate a caution image with respect to the abnormality.

The display control unit 153 controls display of various images on the display unit 61 or the external equipment 122. The recording control unit 154 controls recording of image data obtained by imaging or sound data obtained by sound collection on the removable recording medium 134 or the external equipment 122.

The removable recording medium 134 is a recording medium that can be attached to or detached from the imaging apparatus 11 and is brought into a state of being attached to the imaging apparatus 11 when inserted into the slot 73 illustrated in FIG. 3. The removable recording medium 134 records the image data or the sound data fed from the control unit 133 and feeds the recorded image data or sound data to the control unit 133 as necessary.

The communication unit 135 receives the command transmitted from the remote manipulator 121 through wireless or wired communication and feeds the command to the control unit 133.

The remote manipulator 121 is, for example, a remote commander that is dedicated to the imaging apparatus 11 or is a general-purpose remote commander, and transmits a command through wireless communication, e.g., infrared, or wired communication via the terminal 71 or the like. In addition, the remote manipulator 121 may be achieved by a smartphone or the like such that application software corresponding to the function of the remote commander is installed, for example.

The input/output terminal 136 includes, for example, the terminal 70 or the terminal 71 illustrated in FIG. 3, and is an input/output unit for performing communication with respect to the external equipment 122.

For example, the input/output terminal 136 outputs the image data or the sound data fed from the control unit 133 to the external equipment 122 or outputs the command or the like fed from the external equipment 122 to the control unit 133.

Here, description is given of an operation obtained when the manipulation unit 132 is manipulated and an instruction of imaging of a moving image is given.

The display control unit 153 stops the display of the display unit 61 into the turn-off state when a predetermined time elapses after start of recording a moving image and restores the display of the display unit 61 (into the display state) when a certain manipulation is made by the manipulation unit 132. At this time, when the command is input from the remote manipulator 121 or 123 after the display of the display unit 61 is brought into the turn-off state when a predetermined time elapses from start of recording a moving image, the control unit 133 executes processing corresponding to the command, but the display control unit 153 maintains the turn-off state of the display unit 61. However, in a case where the recording of a moving image is stopped, the display unit 153 restores the display unit 61 into the display state.

Furthermore, when recording of a moving image is started, the recording control unit 154 outputs the image data of a moving image captured by the imaging unit 131 or the sound data obtained by sound collection to the display apparatus 122, which is external equipment, through the input/output terminal 136, and causes the display apparatus 122 to display the image data or the sound data and causes the removable recording medium 134 or the external equipment 122 to record the image data or the sound data. At this time, even when the display of the display unit 61 is brought into the turn-off state by the display control unit 153, the recording control unit 154 continues performing outputting to the display apparatus 122, which is external equipment, and continues performing displaying.

By such an operation, when a moving image is recorded, the display unit 61 is brought into the turn-off state after a predetermined time elapses after start of capturing a moving image, enabling a reduction in power consumption of the display unit 61, which is not frequently viewed during imaging. Furthermore, in a case where, for example, a stage is captured in a dark hall or the like, annoying light can be emitted to the surrounding area when the display unit 61 is in the display state. However, since the display unit 61 is turned off when a predetermined time elapses after start of recording the moving image, it is possible to suppress generation of the annoying light from the display unit 61.

<Imaging Processing by Imaging Apparatus of FIG. 5>

Figure 6:
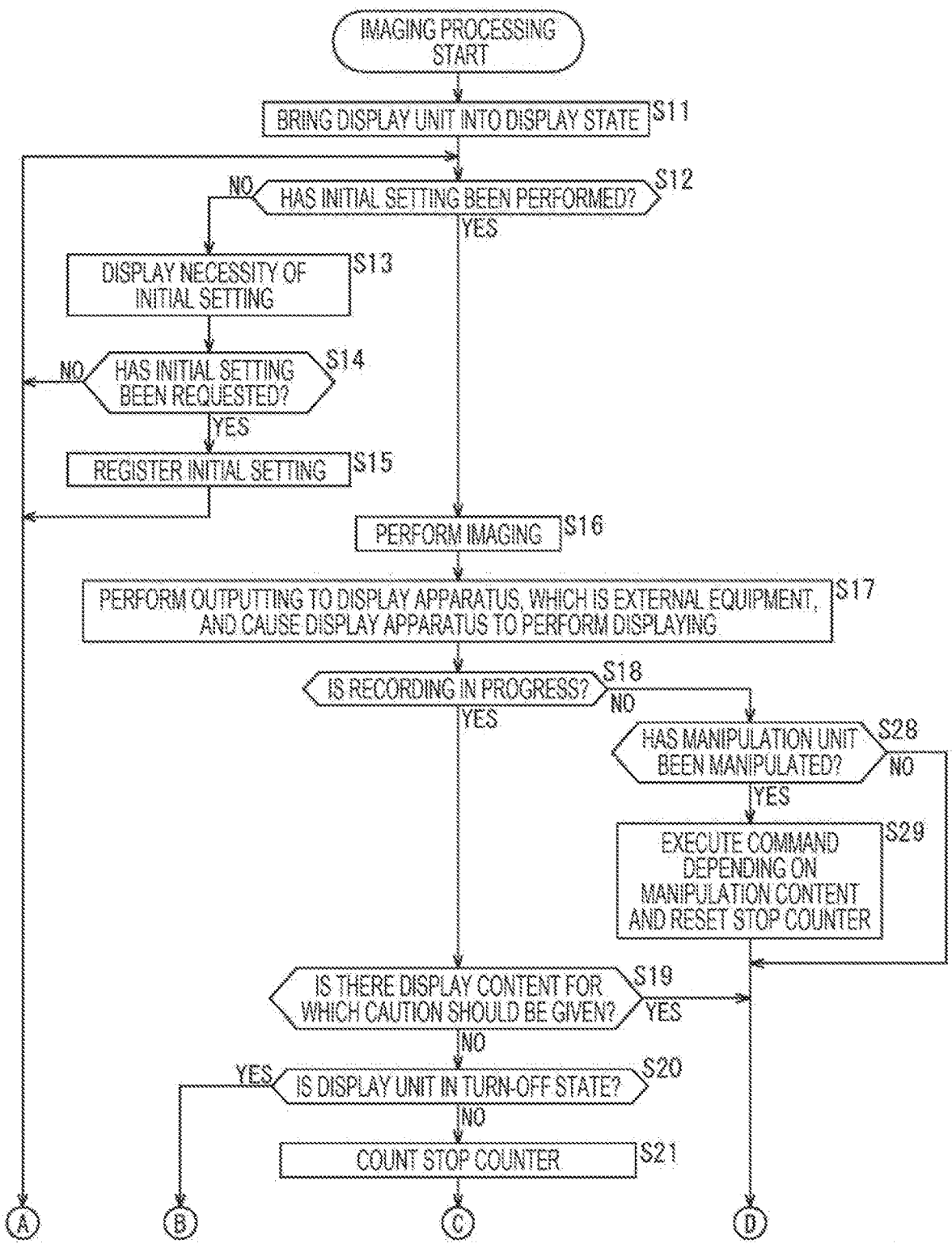
FIG. 6 is a flowchart explaining imaging processing performed by the imaging apparatus of FIG. 5.
Figure 7:
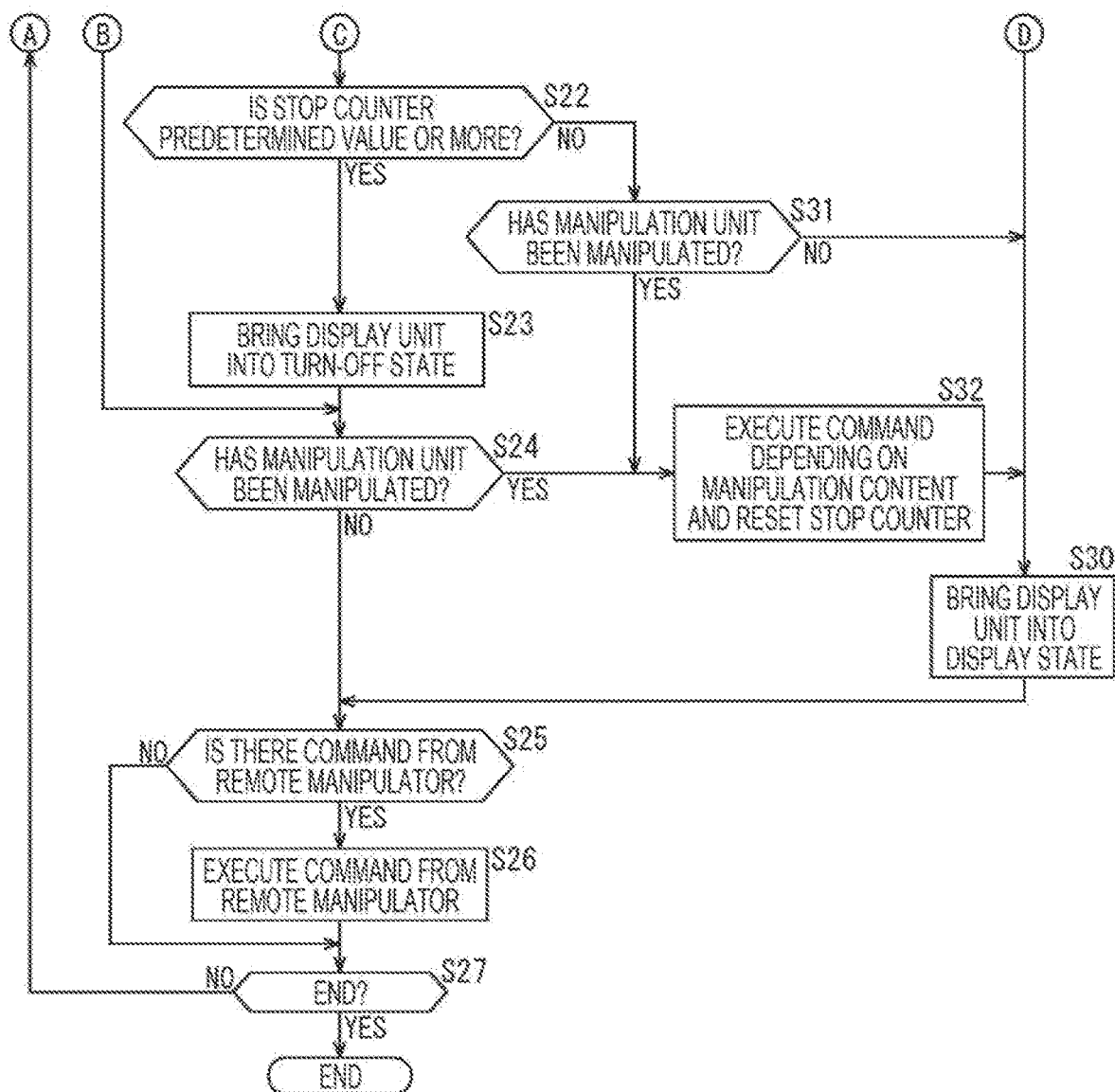
FIG. 7 is a flowchart explaining imaging processing performed by the imaging apparatus of FIG. 5.

Next, imaging processing of a moving image by the imaging apparatus 11 of FIG. 5 is described with reference to the flowcharts of FIGS. 6 and 7.

In step S11 (FIG. 7), when the power is turned on and the imaging apparatus 11 is activated, the display control unit 153 turns on the display unit 61 into a displayable state (display state) to display information corresponding to various processing.

In step S12, the setting unit 151 determines whether or not initial setting has been completed. In a case where the initial setting has not been completed, the processing proceeds to step S13.

In step S13, the OSD image generation unit 152 indicates that the initial setting has not been completed and the initial setting is required, displaying information that prompts initial setting on the display unit 61.

In step S14, the setting unit 151 determines whether or not the manipulation unit 132 has been manipulated and an operation of requesting input of initial setting has been performed. In a case where an operation of requesting input of the initial setting is absent, the processing returns to step S12. In other words, the processing from steps S12 to S14 is repeated until the initial setting is performed. Then, in step S14, in a case where an operation of requesting input of the initial setting is performed, the processing proceeds to step S15.

In step S15, the OSD image generation unit 152 displays an image of accepting input of various initial settings depending on the manipulation content of the manipulation unit 132. At this time, the setting unit 151 accepts and stores input of the initial setting depending on the manipulation content of the manipulation unit 132, and the processing returns to step S11. Herein, the initial setting is, for example, a setting as to which of the main body of the imaging unit 131: the upper surface, the bottom surface, and the side surface faces upward in the vertical direction when imaging is performed, or the like.

When the initial setting is performed by the aforementioned series of processing, in step S12, the initial setting is determined as having been completed and the processing proceeds to step S16. Note that the necessity of the user's initial setting may be eliminated such that any initial setting is performed during manufacture before shipping. In this case, the processing from steps S12 to S15 may be omitted.

In step S16, the imaging unit 131 captures an image on the basis of light from a subject, the light being incident via the lens 21, and the imaging unit 131 feeds the image to the control unit 133.

In step S17, the recording control unit 154 outputs the image data of a moving image captured by the imaging unit 131 or the sound data obtained by sound collection to the display apparatus 122, which is external equipment, through the input/output terminal 136, and causes the display apparatus 122 to display the image data or the sound data.

Figure 8:
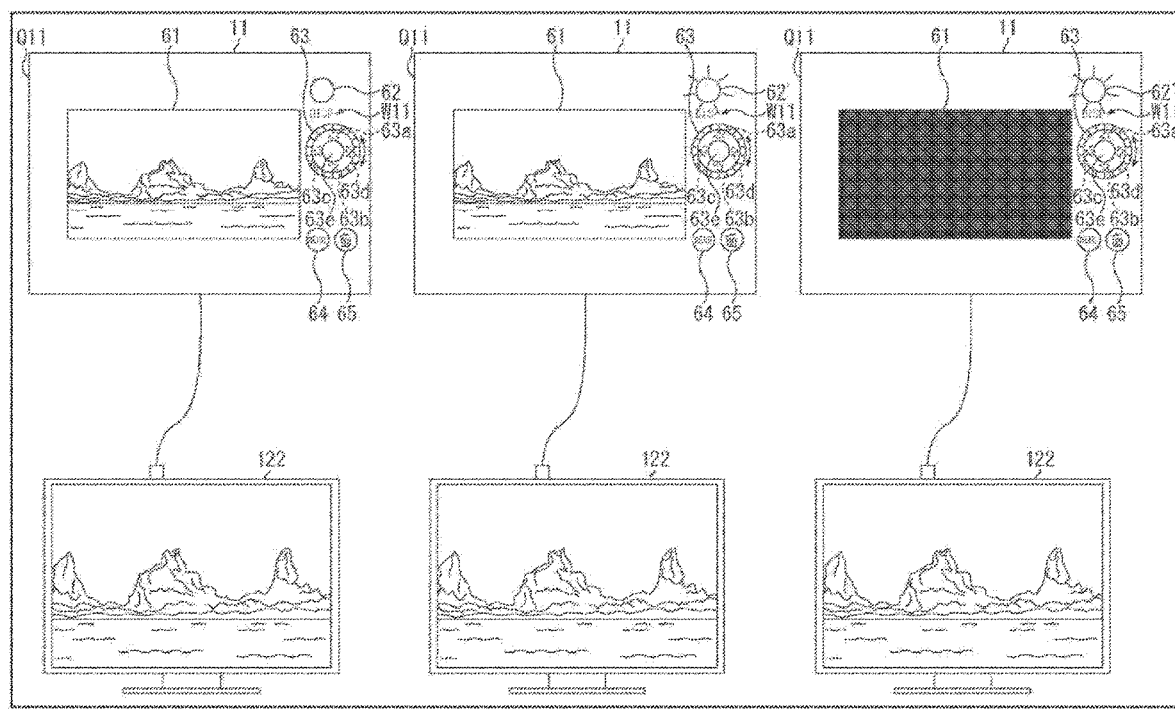
FIG. 8 is a diagram explaining imaging processing performed by the imaging apparatus of FIG. 5.

By this processing, as indicated in the left part of FIG. 8, the display unit 61 is brought into the display state. Therefore, the image captured by the imaging unit 131 is displayed on the display unit 61. At this time, the display apparatus 122, which is external equipment, displays the image captured by the imaging unit 131, the image being fed from the recording control unit 154.

In step S18, the display control unit 153 is instructed to perform recording by the manipulation unit 132 or one of the remote manipulators 121 and 123, and determines whether or not recording of the captured image data is in progress. For example, in a case of first processing and where a recording instruction is not given, i.e., in a case where recording is determined as not being in progress, the processing proceeds to step S28.

In step S28, the display control unit 153 determines whether or not the manipulation unit 132 has been manipulated, i.e., whether or not a certain command has been input by the manipulation, and in the case of the presence of a command from the manipulation unit 132 as a result of the detection of the manipulation of the manipulation unit 132, the processing proceeds to step S29.

In step S29, the control unit 133 executes the processing corresponding to the command input as a result of the manipulation of the manipulation unit 132, and resets a stop counter to be described later to zero. Here, for example, in a case where a command of giving a recording instruction is input, the control recording control unit 154 starts recording the image data captured by the imaging unit 131.

When the recording is started, the control unit 133 controls the tally lamp 62 in the turn-off state in the left part of FIG. 8 so as to become a tally lamp 62' in a turn-on state in the middle part of FIG. 8. Note that the tally lamp 23 of FIG. 1 is controlled in a way similar to the tally lamp 62 and is brought into the turn-on state when recording is in progress.

In step S30 (FIG. 7), the display control unit 153 turns on the display unit 61 into the display state, and the processing proceeds to step S25. For example, in the case of first processing, the display unit 61 is turned on into the display state. Therefore, the display state is maintained.

By this processing, as indicated in the middle part of FIG. 8, the display unit 61 is brought into the display state, and the image captured by the imaging unit 131 is displayed on the display unit 61. Furthermore, at this time, the recording control unit 154 continues feeding the image captured by the imaging unit 131 to the display apparatus 122, which is external equipment. Therefore, the display apparatus 122 displays the image captured by the imaging unit 131 and fed from the recording control unit 154. Moreover, the tally lamp 62 is controlled to the turn-on state as indicated by the tally lamp 62' of FIG. 8.

In step S25, the display control unit 153 determines whether or not the remote manipulator 121 or 123 has been manipulated and a certain command has been input, and in the case of presence of the command from the remote manipulator 121 or 123 as a result of the manipulation of the remote manipulator 121 or 123, the processing proceeds to step S26.

In step S26, the control unit 133 executes the processing corresponding to the command input as a result of the manipulation of the remote manipulator 121 or 123. Note that, in step S25, in a case where the remote manipulator 121 or 123 is not manipulated and a command is not input, the processing of step S26 is skipped.

In step S27, the control unit 133 determines whether or not the manipulation unit 132 or the remote manipulator 121 or 123 has been manipulated and an instruction of ending an operation has been given, and ends the operation in a case where the instruction of end has been given. Furthermore, in a case where an instruction of ending an operation is not given, the processing returns to step S12.

Furthermore, in a case where recording is started in any of steps S29 and S26, when the processing of steps S12, S16, and S17 is performed after the processing of steps S25 to S27, the processing returns to step S18. At this time, in step S18, recording is determined to be in progress, and the processing proceeds to step S19.

In step S19 (FIG. 6), the control unit 133 determines whether or not an abnormality for which a caution should be issued has occurred. Here, in step S19, in a case where it is determined that no abnormality has occurred, the processing proceeds to step S20.

In step S20, the display control unit 153 determines whether or not the display unit 61 is turned off into the turn-off state, and in a case of not being in the turn-off state, the processing proceeds to step S21.

In step S21, the stop counter for determining whether or not to bring the display of the display unit 61, which is not illustrated, into the turn-off state is incremented by a predetermined value and counted up by the display control unit 153.

In step S22 (FIG. 7), the display control unit 153 determines whether or not the stop counter is larger than a predetermined value and the state in which the recording is started and the manipulation unit 132 is not manipulated has elapsed longer than a predetermined time, and in a case of not elapsing longer than the predetermined time, the processing proceeds to step S31.

In step S31, the display control unit 153 determines whether or not the manipulation unit 132 has been manipulated, i.e., whether or not any command has been input as a result of the manipulation, and in a case where the manipulation has not been performed or a command has not been input, the processing proceeds to step S30 and the display unit 61 is turned on into the display state, and the processing proceeds to step S25.

In other words, the processing of steps S12, S16 to S22, S31, S30, and S25 to S27 is repeated until the predetermined time counted by the stop counter elapses from the start of recording, and the count of the stop counter is continued to be counted up. Then, in step S22 (FIG. 7), in a case where it is determined that the value of the stop counter is larger than a predetermined value and the state in which the recording is started and the manipulation unit 132 is not manipulated elapses a predetermined time or longer, the processing proceeds to step S23.

In step S23, the display control unit 153 turns off the display unit 61 into the turn-off state, and the processing proceeds to step S24.

In other words, as a result of this processing, as illustrated in the right part of FIG. 8, the display unit 61 is turned off and the display unit 61 is brought into the turn-off state. Even in this case, however, the image captured by the imaging unit 131 and fed from the recording control unit 154 is displayed on the display apparatus 122, which is external equipment. Moreover, as indicated by the tally lamp 62' in the right part of FIG. 8, the tally lamp 62 is controlled into the turn-on state indicating that recording is in progress.

In step S24, the control unit 133 determines whether or not the manipulation unit 132 has been manipulated, i.e., determines whether or not the manipulation has been performed and any command has been input. In a case where the manipulation is not detected and a command has not been input, the processing proceeds to step S25.

Furthermore, in the following, when the recording is continued, there is no input command, and the state in which display for which a caution should be issued is absent continues, the display unit 61 remains in the turn-off state. Therefore, in step S20 (FIG. 6), the display unit 61 is determined to be in the turn-out state, and the processing from steps S21 to S23 is skipped.

In other words, as a result of the repetition of the processing of steps S12, S16 to S20 and S24 to S27, the state of the right part of FIG. 8 is continued.

Here, for example, in step S25, when the remote manipulator 121 or 123 is manipulated and, for example, a command to stop recording is input, the recording is stopped by the processing of step S26.

Then, in step S18, it is determined that the recording is not in progress, the processing proceeds to step S28.

In other words, in this case, since the processing of steps S12, S16 to S18, S28, S29 (however only in the case of Yes in S28), S30 and S25 to S27 is performed, as indicated in the left part of FIG. 8, when the recording is stopped, the tally lamp 62 is brought into the turn-off state such that the processing of step S30 is invariably involved. Therefore, the display unit 61 is brought into the display state. Furthermore, by the processing of step S17, the image captured by the imaging unit 131 and fed from the recording control unit 154 continues being displayed on the display apparatus 122, which is external equipment.

Moreover, here, for example, in step S25, when the remote manipulator 121 or 123 is manipulated and, for example, a command to start recording is input again, recording is started by the processing of step S26.

Then, in step S18, since it is determined that the recording is in progress, the processing proceeds to step S19. At this time, when display content for which a caution should be issued is absent, the processing proceeds to step S20. Moreover, in step S20 (FIG. 6), since the display unit 61 is already in the display state, the processing proceeds to step S21.

In other words, in this case, the processing of steps S12, S16 to S22, S31, S30 and S25 to S27 is repeated, and the count of the stop counter continues being counted up. Then, in step S22 (FIG. 7), in a case where it is determined that the value of the stop counter is larger than a predetermined value and the state in which the recording is started and the manipulation unit 132 is not manipulated elapses a predetermined time or longer, the processing proceeds to step S23.

In step S23, the display control unit 153 turns off the display unit 61 into the turn-off state, and the processing proceeds to step S24.

In other words, as a result of this processing, as illustrated in the right part of FIG. 8, the display unit 61 is turned off and the display unit 61 is brought into the turn-off state. Even in this case, however, the image captured by the imaging unit 131 and fed from the recording control unit 154 is displayed on the display apparatus 122, which is external equipment. Moreover, as indicated by the tally lamp 62' in the right part of FIG. 8, the tally lamp 62 is controlled into the turn-on state indicating that recording is in progress.

Here, for example, in the processing of step S24, when the manipulation unit 132 is manipulated and a certain command is input, the processing proceeds to step S32.

In step S32, the control unit 133 executes processing corresponding to the command input as a result of the manipulation of the manipulation unit 132 and moreover resets the stop counter to zero. The processing proceeds to step S30. Here, for example, in a case where a command that gives an instruction of stopping the recording is input, the recording control unit 154 stops recording of the image data captured by the imaging unit 131.

When the recording is stopped, the control unit 133 performs control to control the tally lamp 62 into the turn-off state as indicated in the left part of FIG. 8. In this case, since the display unit 61 is turned on into the display state by the processing of step S30, as illustrated in the left part of FIG. 8, the image captured by the display unit 61 is displayed. Furthermore, also at this time, the image captured by the imaging unit 131 and fed from the recording control unit 154 is continued to be displayed on the display apparatus 122, which is external equipment, by the processing of step S17.

Moreover, here, since the stop counter is reset, for example, when the manipulation unit 132 is manipulated during the period from the start of the recording until the display unit 61 is turned off in the processing of step S31, the reset of the stop counter is repeated each time. As a result, even when recording has been started, in a case where the manipulation unit 132 is subsequently manipulated, the display of the display unit 61 is continued until the predetermined time elapses from the last manipulation of the manipulation unit 132.

Furthermore, when it is determined in step S19 that display content for which a caution should be issued is present, the processing proceeds to step S30. The display unit 61 is turned on into the display state, and displays information for which a caution should be issued. In other words, in this case, the processing of steps S12, S16 to S19, S30 and S25 to S27 is repeated, and, in this case, for example, in a case where the battery 137 has a small remaining charge level or an abnormality, e.g., overheat, is detected, these pieces of information are displayed, and the moving image captured by the imaging unit 131 is displayed.

To summarize the above processing, the image captured by the imaging unit 131 continues being displayed on the display unit 61 and the display apparatus 122, which is external equipment, until the recording is started in the first processing.

Here, when the manipulation unit 132 of the main body or the remote manipulator 121 or 123 is manipulated and an instruction of recording is given, a recording operation is started, an instruction of recording is given, and the state in which the manipulation unit 132 is not manipulated continues for a predetermined time, the display of the display unit 61 is controlled into the turn-off state. In the period from the start of the recording until the predetermined time elapses, the stop counter is reset each time when the manipulation unit 132 of the main body is manipulated and any manipulation including the manipulation related to recording is detected. Thus, the display unit 61 is turned on into the display state until the predetermined time elapses after the last manipulation of the manipulation unit 132. When the predetermined time elapses from the last manipulation of the manipulation unit 132, the display unit 61 is controlled into the turn-off state.

Moreover, in a case where the manipulation of the remote manipulator 121 or 123 is detected with the display unit 61 being in the turn-off state, when the recording is in progress, the control unit 133 executes a command corresponding to the detected manipulation content. However, the display unit 61 is not turned on into the display state, but remains in the turn-off state. However, in a case where the detected manipulation content is to perform the manipulation of stopping the recording, the recording becomes not in progress. At this time, the display unit 61 returns to the display state.

Furthermore, in a case where a remaining battery charge level is small or an abnormality, such as overheat, is detected, the display unit 61 is constantly turned on into the display state, and the display unit 61 continues displaying information indicating the occurrence of the abnormality. Note that, in a case where all abnormalities are detected, the display state may not be restored from the turn-off state. The turn-off state may be switched to the display state, for example, only in a case where an abnormality of a specific type occurs among detected abnormalities, or for example, only in a case where an urgent abnormality occurs.

As a result, the display unit 61, which is not frequently viewed after the recording is started, can be brought into the turn-off state when a predetermined time elapses without user's consciousness, enabling a reduction in power consumption. Furthermore, in a case where imaging is performed in dark environments, e.g., a concert hall, when the display unit 61 is turned on over a minimally required time, it is possible to prevent to emit annoying light to the surrounding area.

Note that, heretofore, the description is given of the example in which the captured image data is output to the display apparatus 122, which is external equipment, from the imaging apparatus 11 and displayed on the display apparatus 122. However, even during use in a state in which the display apparatus 122, which is external equipment, is not connected, the processing of step S17 described above is merely skipped and the imaging apparatus 11 is solely operated without the display apparatus 122 illustrated in FIG. 8. Therefore, a detailed description is omitted.

In the above, the description is given of the example in which a moving image is captured by the imaging apparatus 11. However, the above-described imaging processing may be applied not only to a moving image, but also to capturing of various images. For example, even in a case of capturing a still image with long-time exposure or repeatedly and continuously capturing an image including a still image at predetermined time intervals, the above-described imaging processing can be applied and a similar effect can be obtained.

Furthermore, in the above, the description is given of the example in which the display unit 61 is controlled to one of the states: the display state and the turn-off state. However, in a case of being controlled to the turn-off state, the display unit 61 may be controlled to a dimming state (for example, a state of brightness such as 30% or 50%) with reduced brightness instead of the turn-off state. Furthermore, the brightness may be gradually reduced in accordance with the elapsed time. For example, in a case where a predetermined time elapses in a state in which the manipulation is not accepted in the manipulation unit 132 after the start of recording, the brightness may be set to about 50%, which is still the display state, and in a case where a predetermined time has further elapsed, the brightness may be set to about 20%, which is still the display state, or in a case where a predetermined time has further elapsed, a full turn-off state may be provided.

Furthermore, in the above, the description is given of the example in which in a case where a predetermined time elapses in a state in which the manipulation unit 132 provided in the main body of the imaging apparatus 11 is not manipulated after the recording is started, i.e., after the manipulation indicating the start of recording is accepted, the display unit 61 is brought into the turn-off state and the display unit 61 does not return to the display state until the manipulation unit 132 in the main body of the imaging apparatus 11 is manipulated or the recording is stopped.

However, regarding the case where a command corresponding to the manipulation for stopping recording is accepted from any of the remote manipulators 121 and 123, the display unit 61 may not be brought into the display state, but remains in the turn-off state such that the turn-off state is maintained until the manipulation unit 132 of the main body is manipulated.

Furthermore, in a case where a predetermined time elapses without the manipulation unit 132 being manipulated after a command corresponding to the manipulation of giving an instruction of any predetermined operation other than the recording operation is accepted, the display unit 61 may be brought into the turn-off state.

For example, in a case where a predetermined time elapses in a state in which the manipulation unit 132 of the main body of the imaging apparatus 11 is not manipulated after the power button, which is a part of the manipulation unit 132, of the imaging apparatus 11 is manipulated and the power is turned on, the display unit 61 may be controlled to the turn-off state and then the display unit 61 may be returned to the display state in a case where the manipulation unit 132 is manipulated. Furthermore, similarly, in a case where a predetermined time elapses in a state in which the manipulation unit 132 of the main body of the imaging apparatus 11 is not manipulated after the manipulation unit 132 for giving an instruction of various setting operations accepts any predetermined manipulation, the display unit 61 may be controlled to the turn-off state and then the display unit 61 may be returned to the display state in a case where a manipulation of giving an instruction of any operation is accepted by the manipulation unit 132. In both cases, it is possible to achieve power saving, and it is possible to suppress emission of annoying light to the surrounding area in a dark place such as a concert hall.

<Example of Execution by Software>

Incidentally, the series of processing described above can be executed by hardware, but it can also be executed by software. In a case where the series of processing is executed by software, a program that constitutes the software is installed, from a recording medium, in a computer incorporated in a dedicated hardware or, for example, in a general-purpose personal computer and the like that can execute various functions when various programs are installed.

Figure 9:
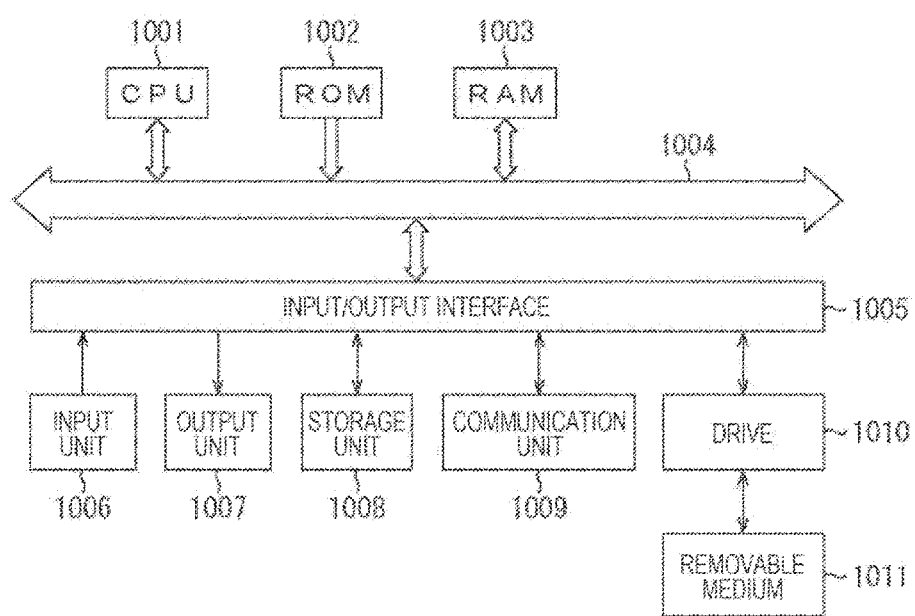
FIG. 9 is a diagram explaining a configuration example of a general-purpose personal computer.

FIG. 9 illustrates a configuration example of a general-purpose personal computer. This personal computer includes a central processing unit (CPU) 1001. An input/output interface 1005 is connected to the CPU 1001 via a bus 1004. A read only memory (ROM) 1002 and a random access memory (RAM) 1003 are connected to the bus 1004.

An input unit 1006 including an input device, e.g., a keyboard or a mouse with which the user inputs a manipulation command, an output unit 1007 for outputting a processing manipulation screen or a processing result image to a display device, a storage unit 1008 including a hard disk drive and the like for storing a program or various data, and a communication unit 1009 including a local area network (LAN) adapter and the like and executing communication processing via a network represented by the Internet are connected to the input/output interface 1005. Furthermore, a drive 1010 is connected that reads and writes data with respect to a removable medium 1011 including a magnetic disk (including a flexible disk), an optical disk (including a compact disc-read only memory (CD-ROM), a digital versatile disc (DVD), a magneto-optical disk (including a mini disc (MD)), a semiconductor memory, and the like.

The CPU 1001 executes various processing according to a program stored in the ROM 1002 or a program that is read from the removable medium 1011, e.g., a magnetic disk, an optical disk, a magneto-optical disk, or a semiconductor memory, installed in the storage unit 1008, and loaded in the RAM 1003 from the storage unit 1008. Data or the like required for the CPU 1001 to execute various processing are also stored in the RAM 1003 as appropriate.

In the computer configured in the manner described above, the series of processing described above is performed, for example, such that the CPU 1001 loads the program stored in the storage unit 1008 into the RAM 1003 via the input/output interface 1005 and the bus 1004 and executes the program.

The program to be executed by the computer (CPU 1001) can he provided by being recorded on the removable medium 1011, for example, as a package medium or the like. Furthermore, the program can be provided via a wired or wireless transmission medium such as a local area network, the Internet, or digital satellite broadcasting.

In the computer, the program can be installed in the storage unit 1008 via the input/output interface 1005 by attaching the removable medium 1011 to the drive 1010. Furthermore, the program can be received by the communication unit 1009 via a wired or wireless transmission medium and installed in the storage unit 1008. In addition, the program can be pre-installed in the ROM 1002 or the storage unit 1008.

Note that the program executed by the computer may be a program by which processing is performed in a chronological order according to the order described in the present description or may be a program by which processing is performed in parallel or at a required timing when a call is made or the like.

Note that the CPU 1001 in FIG. 10 corresponds to the control unit 133, the input unit 1006 and the output unit 1007 correspond to the input/output terminal 136, and the communication unit 1009 corresponds to the communication unit 135.

Furthermore, in the present description, a system means a cluster of a plurality of constituent elements (apparatuses, modules (parts), etc.) and it does not matter whether or not all the constituent elements are in the same casing. Therefore, a plurality of apparatuses that are housed in different casings and connected by a network, and a single apparatus in which a plurality of modules are housed in a single casing are both the system.

Note that the embodiment of the present disclosure is not limited to the aforementioned embodiment, but various modifications may be made without departing from the gist of the present disclosure.

For example, the present disclosure can adopt a configuration of cloud computing in which one function is shared and jointly processed by a plurality of apparatuses via a network.

Furthermore, each step described in the above-described flowcharts can be executed by a single apparatus or shared and executed by a plurality of apparatuses.

Moreover, in a case where a plurality of processing is included in a single step, the plurality of processing included in the single step can be executed by a single apparatus or can be shared and executed by a plurality of apparatuses.

Note that the present disclosure may adopt the configuration described below.

<1> An imaging apparatus including:
an imaging unit configured to capture an image;
a manipulation unit configured to accept a user manipulation and give an instruction of an operation depending on content of the accepted manipulation; and
a display control unit configured to control display of the captured image, in which
the display control unit controls the display of the image from a display state to a turn-off state in a case where a predetermined time elapses in a state in which manipulation with respect to the manipulation unit is not detected after start of a predetermined operation.

<2> The imaging apparatus according to <1>, in which
the display control unit controls the display of the image from the display state to the turn-off state in a case where a predetermined time elapses in a state in which manipulation with respect to the manipulation unit is not accepted after start of a recording operation as the predetermined operation.

<3> The imaging apparatus according to <2>, in which
the display control unit controls the display of the image from the turn-off state to the display state in a case where the recording operation is stopped after control is performed from the display state in which the image is displayed to the turn-off state in which the display of the image is turned off.

<4> The imaging apparatus according to <3>, in which
the display control unit controls the display of the image from the turn-off state to the display state in a case where manipulation is accepted by the manipulation unit after the display of the image is controlled from the display state to the turn-off state.

<5> The imaging apparatus according to <2>, further including:
a reception unit configured to receive a signal from a remote manipulation unit that is external to an apparatus main body and configured to accept a user manipulation and transmit an instruction depending on the content of the accepted manipulation as the signal, in which
the display control unit controls the display of the image from the display state to the turn-off state in a case where a predetermined time elapses in a state in which manipulation with respect to the manipulation unit is not accepted and in a state in which the signal from the remote manipulation unit is not received via the reception unit after start of the recording operation as the predetermined operation.

<6> The imaging apparatus according to <5>, in which
the display control unit performs control to maintain the turn-off state even in a case where the signal from the remote manipulation unit is received via the reception unit after the display of the image is controlled from the display state to the turn-off state.

<7> The imaging apparatus according to <5>, in which
the reception unit receives an instruction from a remote commander or a smartphone depending on the content of the user manipulation with respect to the remote commander or the smartphone as the remote manipulation unit.

<8> The imaging apparatus according to any one of <2> to <7>, further including:
an input/output unit configured to constantly output the image captured by the imaging unit to external equipment connected to the outside.

<9> The imaging apparatus according to <8>, in which
the input/output unit accepts, via the external equipment, input of the signal from the remote manipulation unit that is external to the external equipment and configured to accept the user manipulation and transmit an instruction depending on the content of the accepted manipulation as the signal, and
the display control unit controls the display of the image from the display state to the turn-off state in a case where a predetermined time elapses in a state in which the manipulation with respect to the manipulation unit is not accepted and in a state in which the manipulation with respect to the remote manipulation unit is not accepted via the input/output unit after start of the predetermined operation.

<10> The imaging apparatus according to <9>, in which
the display control unit performs control to maintain the turn-off state even when the signal from the remote manipulation unit is accepted via the input/output unit after the display of the image is controlled from the display state to the turn-off state.

<11> The imaging apparatus according to <8>, in which
the external equipment is a display apparatus configured to display an image captured by the imaging unit.

<12> The imaging apparatus according to any one of <1> to <11>, in which
the predetermined operation is a recording operation, a power-on operation, or various setting operations.

<13> The imaging apparatus according to any one of <1> to <12>, further including:
an abnormality detection unit configured to detect occurrence of an abnormality, in which in a case where an abnormality is detected by the abnormality detection unit, the display control unit controls the display of the image to the display state.

<14> The imaging apparatus according to any one of <1> to <13>, further including:
a setting unit configured to perform setting related to imaging by the imaging unit, in which under a condition that the setting related to the imaging by the imaging unit is completed by the setting unit, the display control units controls the display of the image from the display state to the turn-off state in a case where a predetermined time elapses in a state in which the manipulation with respect to the manipulation unit is not accepted after start of the predetermined operation.

<15> An imaging method including steps of:
capturing an image;
accepting a user manipulation and giving an instruction of an operation depending on content of the accepted manipulation; and
controlling display of the captured image, in which
the display of the image is controlled from a display state to a turn-off state in a case where a predetermined time elapses in a state in which manipulation with respect to the manipulation unit is not detected after start of a predetermined operation.

<16> A program causing a computer to function as:
an imaging unit configured to capture an image;
a manipulation unit configured to accept a user manipulation and give an instruction of an operation depending on content of the accepted manipulation; and
a display control unit configured to control display of the captured image, in which
the display control unit controls the display of the image from a display state to a turn-off state in a case where a predetermined time elapses in a state in which manipulation with respect to the manipulation unit is not detected after start of a predetermined operation.

REFERENCE SIGNS LIST

11 Imaging apparatus
23 Tally lamp
61 Display unit
62 Tally lamp
121 Remote manipulator
122 Display apparatus (external equipment)
123 External equipment remote manipulator
131 Imaging unit
132 Manipulation unit
133 Control unit
134 Removable recording medium
135 Communication unit
136 Input/output terminal
137 Battery
151 Setting unit
152 OSD image generation unit
153 Display control unit
154 Recording control unit

What is claimed is:

1. An imaging apparatus, comprising:
    circuitry configured to:
        control, in response to a remote recording stop operation, a display to change from a first state to a second state, wherein
            the first state is a turn-off state of the display, and
            the second state is a turn-on state of the display;
        control, in response to remote operations that are different from the remote recording stop operation, the display to continue to be in the first state;
        control, based on absence of a user input to control the imaging apparatus for a specific time period during a recording processing of a captured image, the display to change from the second state to the first state;
        detect an abnormality related to the imaging apparatus; and
        control, in response to the detection of the abnormality, the display to change from the first state to the second state.

2. The imaging apparatus of claim 1, wherein
the circuitry is further configured to control the recording processing of the captured image,
a live-view image of the captured image is displayed in the second state, and
the live-view image of the captured image is not displayed in the first state.

3. The imaging apparatus of claim 2, wherein the circuitry is further configured to:
    execute, based on reception of a command when the display of the live-view image is turned-off, a processing operation related to the received command while maintaining the display of the live-view image as turned-off.

4. The imaging apparatus of claim 2, wherein the captured image is a movie.

5. The imaging apparatus of claim 2, wherein
the circuitry is further configured to:
    control, based on the detection of the abnormality, display of the live-view image at a first timing,
    control display of a notification at a second timing, and
    control display of the second state at a third timing,
the first timing, the second timing, and the third timing are in a sequence, and
the notification corresponds to the detection of the abnormality.

6. The imaging apparatus of claim 1, wherein the imaging apparatus is driven by power fed from a battery.

7. The imaging apparatus of claim 6, wherein the detected abnormality is associated with the battery.

8. The imaging apparatus of claim 7, wherein the detected abnormality corresponds to a remaining charge level of the battery less than a threshold.

9. The imaging apparatus of claim 1, wherein the detected abnormality corresponds to an overheating of the imaging apparatus greater than a threshold.

10. The imaging apparatus of claim 1, the circuitry is further configured to control the display to display information related to the detection of the abnormality.

11. The imaging apparatus of claim 1, wherein the circuitry is further configured to control display of an On Screen Display (OSD) image, the OSD image is an image that indicates a mark which corresponds to at least one of an imaging mode of the imaging apparatus, a remaining charge level of a battery of the imaging apparatus, information related to a white balance setting of the imaging apparatus, or a state related to the imaging apparatus.

12. The imaging apparatus of claim 1, wherein
the imaging apparatus further includes a tally lamp, and
the circuitry is further configured to control the tally lamp to a turn-on state, when the recording processing is in progress and the display is in the turn-off state.

13. The imaging apparatus of claim 1, wherein
the circuitry is further configured to:
    control acceptance of a first user manipulation;
    provide a first instruction of an operation based on content of the accepted first user manipulation;
    control the display to change from the second state to the first state, based on elapse of a first time in a state in which the first user manipulation to control the display is unaccepted after start of the recording processing; and
    control the display to change from the first state to the second state based on stopping of the recording processing.

14. The imaging apparatus according to claim 13, wherein the circuitry is further configured to control the display of to change from the first state to the second state based on acceptance of a second user manipulation after the display is in the first state.

15. The imaging apparatus according to claim 13, wherein the circuitry is further configured to:
    control reception of a signal from a remote control device external to the imaging apparatus;
    accept a third user manipulation based on the signal;
    transmit a second instruction based on content of the accepted third user manipulation; and control the display to change from the second state to the first state based on the elapse of the first time in the state in which the first user manipulation is unaccepted and based on elapse of a second time in a state in which the signal from the remote control device is not received after start of the recording processing.

16. The imaging apparatus according to claim 15, wherein the circuitry is further configured to control to maintain the first state even where the signal from the remote control device is received after the display is controlled from the second state to the first state.

17. A method, comprising:
controlling, by a circuitry, in response to a remote recording stop operation, a display to change from a first state to a second state, wherein
the first state is a turn-off state of the display, and
the second state is a turn-on state of the display;
controlling, by the circuitry, in response to remote operations that are different from the remote recording stop operation, the display to continue to be in the first state;
controlling, by the circuitry, based on absence of a user input to control an imaging apparatus for a specific time period during recording, the display to change from the second state to the first state;
detecting, by the circuitry, an abnormality related to the imaging apparatus; and
controlling, by the circuitry, in response to the detection of the abnormality, the display to change from the first state to the second state.

18. A non-transitory computer-readable medium having stored thereon, computer-executable instructions which, when executed by a computer, cause the computer to execute operations, the operations comprising:
controlling, in response to a remote recording stop operation, a display to change from a first state to a second state, wherein
the first state is a turn-off state of the display, and
the second state is a turn-on state of the display;
controlling, in response to remote operations that are different from the remote recording stop operation, the display to continue to be in the first state;
controlling, based on absence of a user input to control an imaging apparatus for a specific time period during recording, the display to change from the second state to the first state;
detecting an abnormality related to the imaging apparatus; and
controlling, in response to the detection of the abnormality, the display to change from the first state to the second state.

* * * * *